United States Patent
Chadha et al.

(10) Patent No.: US 10,861,453 B1
(45) Date of Patent: Dec. 8, 2020

(54) RESOURCE SCHEDULING WITH VOICE CONTROLLED DEVICES

(71) Applicant: Amazon Technologies, Inc., Seattle, WA (US)

(72) Inventors: Kunal Chadha, Kirkland, WA (US); James L. Ford, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 294 days.

(21) Appl. No.: 15/968,547

(22) Filed: May 1, 2018

(51) Int. Cl.
| | | |
|---|---|---|
| G10L 15/22 | (2006.01) | |
| G10L 15/18 | (2013.01) | |
| G06Q 10/02 | (2012.01) | |
| G10L 15/30 | (2013.01) | |

(52) U.S. Cl.
CPC .............. G10L 15/22 (2013.01); G06Q 10/02 (2013.01); G10L 15/1815 (2013.01); G10L 15/30 (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,774,132 B2* | 8/2010 | DeGrazia | G01C 21/20 701/420 |
| 9,460,722 B2 | 10/2016 | Sidi et al. | |
| 9,881,617 B2 | 1/2018 | Sidi et al. | |
| 10,109,280 B2 | 10/2018 | Sidi et al. | |
| 2001/0014866 A1* | 8/2001 | Conmy | G06F 40/14 705/7.19 |
| 2003/0154072 A1 | 8/2003 | Young et al. | |
| 2007/0083374 A1 | 4/2007 | Bates et al. | |
| 2008/0048021 A1* | 2/2008 | Shieh | G07F 7/084 235/380 |
| 2008/0181140 A1* | 7/2008 | Bangor | H04L 12/1818 370/261 |
| 2008/0235084 A1* | 9/2008 | Quoc | G06Q 30/0242 705/14.41 |
| 2010/0046553 A1* | 2/2010 | Daigle | H04L 69/22 370/474 |
| 2011/0195699 A1* | 8/2011 | Tadayon | H04M 3/53 455/418 |
| 2012/0311038 A1* | 12/2012 | Trinh | H04L 65/1083 709/204 |
| 2014/0074537 A1* | 3/2014 | Bargetzi | G06Q 10/02 705/7.19 |
| 2015/0025887 A1 | 1/2015 | Sidi et al. | |

(Continued)

FOREIGN PATENT DOCUMENTS

WO 2015196063 A1 12/2015

*Primary Examiner* — Thuykhanh Le
(74) *Attorney, Agent, or Firm* — Lowenstein Sandler LLP

(57) ABSTRACT

A processing device receives from a speech-detection device intent data and metadata associated with an intent to schedule a resource located in proximity to a location of the speech-detection device. The metadata includes one or more device identifiers associated with one or more devices discovered by the speech-detection device. The processing device determines an availability of resources associated with the one or more device IDs and schedule one of the resources based on the availability. The scheduled resource is located in in proximity to the location of the speech-detection device.

20 Claims, 11 Drawing Sheets

(56) References Cited

U.S. PATENT DOCUMENTS

| | | | |
|---|---|---|---|
| 2015/0112738 A1* | 4/2015 | Marinaro | G06Q 10/02 |
| | | | 705/5 |
| 2015/0310861 A1* | 10/2015 | Waltermann | G10L 15/1815 |
| | | | 704/275 |
| 2015/0324708 A1* | 11/2015 | Skipp | H04W 4/029 |
| | | | 705/5 |
| 2016/0028878 A1* | 1/2016 | Davis | G06Q 10/109 |
| | | | 704/275 |
| 2016/0071525 A1* | 3/2016 | Di Censo | G10L 21/0208 |
| | | | 704/226 |
| 2016/0125879 A1* | 5/2016 | Lovitt | G10L 17/00 |
| | | | 704/275 |
| 2016/0261648 A1* | 9/2016 | Ruetschi | G06F 40/263 |
| 2016/0300160 A1* | 10/2016 | Klein | H04W 8/005 |
| 2017/0053653 A1 | 2/2017 | Sidi et al. | |
| 2017/0068551 A1* | 3/2017 | Vadodaria | G06F 3/0482 |
| 2017/0091890 A1* | 3/2017 | Hirose | G06Q 50/30 |
| 2017/0147951 A1* | 5/2017 | Meyer | G06Q 10/02 |
| 2017/0278514 A1* | 9/2017 | Mathias | G10L 15/22 |
| 2017/0357915 A1* | 12/2017 | Holmes | G06F 3/04817 |
| 2018/0032997 A1* | 2/2018 | Gordon | G06Q 30/0269 |
| 2018/0039917 A1* | 2/2018 | Buttolo | G06Q 10/0631 |
| 2018/0139253 A1* | 5/2018 | Ruetschi | G06F 40/58 |
| 2018/0158464 A1 | 6/2018 | Sidi et al. | |
| 2018/0349856 A1* | 12/2018 | Kalisz | G06Q 10/06311 |
| 2018/0349857 A1* | 12/2018 | Dahir | G06Q 10/1095 |
| 2019/0102211 A1* | 4/2019 | Root | H04L 67/141 |
| 2019/0182176 A1* | 6/2019 | Niewczas | H04L 63/104 |
| 2019/0236554 A1* | 8/2019 | Hill | G06Q 10/1095 |
| 2019/0251505 A1* | 8/2019 | Simms | G06Q 10/1097 |
| 2019/0266517 A1* | 8/2019 | Nordstrom | G06Q 10/02 |
| 2019/0340564 A1* | 11/2019 | Holmquist | H04L 43/0876 |
| 2019/0370700 A1* | 12/2019 | Ludwig | G06Q 10/00 |

\* cited by examiner

RESOURCE SCHEDULING WITH VOICE CONTROLLED DEVICES

RELATED APPLICATIONS

This application is related to co-pending U.S. patent application No., to be assigned, entitled "Anomaly Detection for Voice Controlled Devices," filed concurrently.

BACKGROUND

Homes and businesses are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech. Some computing devices include a voice user interface (VUI) that enables a user to interact with the computing devices using speech.

BRIEF DESCRIPTION OF DRAWINGS

For a more complete understanding of the present disclosure, reference is now made to the following description taken in conjunction with the accompanying drawings.

DETAILED DESCRIPTION

Figure 1:
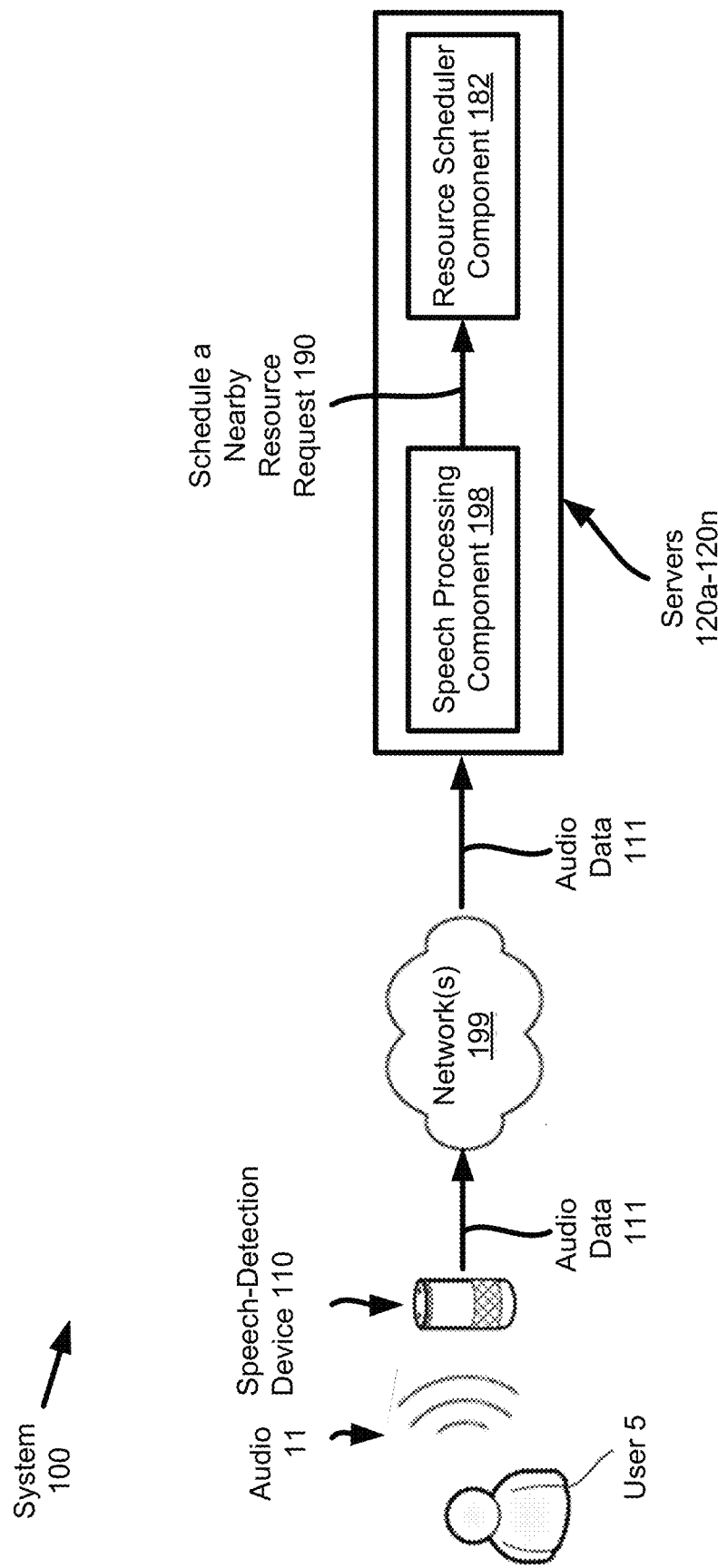
FIG. 1 illustrates a system configured to perform resource scheduling using audio data from a speech-detection device according to embodiments of the present disclosure.

Embodiments described herein are directed to a resource scheduling component for a speech processing system that includes a natural language user interface (e.g., such as a VUI). VUIs receive voice inputs and perform operations based on those voice inputs. Speech-detection devices (e.g., such as the Amazon Echo, Google Home, Apple HomePod, etc.) are increasingly used by businesses and organizations. For example, such speech-detection devices may be used in conference rooms to provide a VUI for joining conference calls, controlling lights, and so on. In another example, hotels may stock hotel rooms with speech-detection devices to enable guests to, for example, control lighting and/or electronics in the hotel room via a VUI. In another example, stadiums may include speech-detection devices.

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. ASR and NLU may be used together as part of a speech processing system.

Speech-detection devices, including those used by businesses and organizations, can be used in connection with a web service, such as the AWS Alexa for Business (A4B) service. The web service may allow customers to manage speech-detection devices in enterprise domains. In an enterprise use case, when an employee wants to schedule a meeting room for a meeting, the employee can ask any nearby speech-detection devices to do so on their behalf using the embodiments described herein. For example, a speech-detection device can detect a speaker identifier (ID) based on a voice fingerprint associated with a speaker of an utterance in audio data captured by the speech-detection device. The speech-detection device can update the user's calendar accordingly when scheduling the meeting room. To schedule a nearby conference room, for example, the speech-detection device can detect its own location and find any nearby conference rooms associated with nearby devices that can be discovered by the speech-detection device. For example, the Echo Plus device, developed by Amazon.com, has a built-in ZigBee® hub. The ZigBee® hub can create a mesh network of nearby devices, where each device can communicate with each other directly or through intervening devices (referred to as hops). The ZigBee® hub can be used to identify device IDs of the discovered devices, as well as determine distances between devices. When the user requests a meeting room using the speech-detection device nearby, the speech-detection device can detect all (or up to a fixed number of) nearby speech-detection devices (or other types of devices on the mesh network) and send their information, such as the device's media access control (MAC) address) to the web service (e.g., Amazon A4B service). The web service can look up the rooms and calendars associated with all nearby speech-detection devices and schedule a meeting in one of them. It should be noted that although some embodiments may use the ZigBee® hub, other radio technologies may be used for the mesh network communications by the speech-detection device, such as GPS, GNSS, Bluetooth®, low power Bluetooth®, or other wireless personal area network (PAN) technologies. Alternatively, the speech-detection device can communicate with the other discovered devices using a short-range wireless mesh network standard, such as INSTEON, IrDA, Wireless USB, Bluetooth®, Z-wave®, ZigBee® standards, or the like. In some embodiments, one type of radio communications can be used to discover the nearby devices, while another type of radio communications can be used to interact with the web service.

Embodiments described herein provide increased capabilities for speech-detection devices and web services interacting with these speech-detection devices by implementing a resource scheduling component of a speech processing system. The resource scheduling component receives from a speech-detection device intent data and metadata associated with an intent to schedule a resource located in proximity to a location of the speech-detection device. The metadata includes one or more device identifiers associated with one or more devices discovered by the speech-detection device. The resource scheduling component determines an availability of resources associated with the one or more device IDs and schedules one of the resources based on the availability. Using this technology, the scheduled resource is located in in proximity to the location of the speech-detection device. The resource scheduling component can process new audio data representing new utterances (e.g., new voice commands) received from a speech-detection device for scheduling a nearby resource as described herein. Accordingly, the capabilities associated with speech-detection devices, speech processing systems and VUIs may be improved using the embodiments described herein.

FIG. 1 shows a system 100 configured to perform resource scheduling using audio data, in accordance with some embodiments of the present disclosure. As shown in FIG. 1, a speech-detection device 110 and servers 120a-n may be in communication over one or more networks 199. The servers 120a-n (which may be one or more different physical devices) may be capable of performing traditional speech processing (e.g., ASR, NLU, command processing, etc.) as well as other operations as described herein. One or more of the servers 120a-n may include a speech processing component 198 and a resource scheduling component 182, both of which are described in greater detail below with reference to FIGS. 2-3. A single server 120a may perform all speech processing or multiple servers 120a-n may combine to perform all speech processing. Further, the servers 120a-n may execute certain commands, such as answering spoken utterances of users 5, performing actions requested by users 5, and operating other devices (e.g., light switches, appliances, etc.). In some embodiments, servers 120a-n include a first server 120a or set of servers that perform speech processing, a second server 120b or set of servers that include one or more command processors, through an nth server 120n or set of servers that include one or more components that each provide distinct functionality (e.g., that provide a distinct service such as the resource scheduling service provided by resource scheduling component 182). Alternatively, a single server may include both a speech processing component 198 and one or more additional components.

A speech-detection device 110 may be a device that captures audio 11 including a spoken utterance of a user 5 via a microphone or microphone array of the speech-detection device 110. The speech-detection device 110 may be, for example, a dedicated speech-detection device that includes a VUI. In some cases, the dedicated speech-detection device lacks other user interfaces such as a graphical user interface (GUI). In other cases, the dedicated speech-detection device includes a GUI. The speech-detection device 110 may also be a device such as a mobile phone, tablet computer, laptop computer, desktop computer, etc. that includes a speech-detection application that causes the device to function as a speech-detection device. The audio 11 may include a voice activation command for the speech-detection device 110, which may place the speech-detection device 110 into a listening mode. The audio 11 may additionally include an additional command, a question, and/or other utterance. While in the listening mode, the speech-detection device 110 activates one or more microphones that captures the audio 11 comprising the additional command, question, and/or other utterance and sends the captured audio to the one or more servers 120a-n.

Processing logic of the one or more servers 120a-n receives the captured audio data 111 from the speech-detection device 110. Speech processing 198 converts the audio data 111 to text data. The speech processing component 198 determines intent data and associated entity data from the text data. The speech-processing component 198 may additionally determine a component that may perform an operation associated with the intent data and entity data (e.g., to satisfy an intent represented by the intent data and/or the entity data). The speech-processing component 198 may then provide the intent data, entity data, and/or an identifier (e.g., component identifier (ID)) of the determined component to resource scheduling component 182. The resource scheduling component may additionally receive other data such as metadata from the audio data 111 (e.g., which may include a device ID such as a device serial number (DSN), a timestamp, location information (e.g., a global positioning system (GPS) location of the speech-detection device 110, an internet protocol (IP) address of a network to which the speech-detection device 110 is connected, and so on), etc. As described herein, the metadata may also include an ID or location of the speech-detection device 110 and a set of device IDs, each device ID corresponding to another speech-detection device (or other device) located in proximity to the location of the speech-detection device 110. The set of device IDs may be acquired during a discovery process used in a separate communication protocol, such as a short-range wireless mesh network standard. In one embodiment, the speech-detection device 110 includes a wireless hub (e.g., ZigBee® hub) that permits the speech-detection device 110 to discover and communication with other devices on a mesh network. In another embodiment, a radio can be used to discover devices on the mesh network for purpose of resource scheduling.

Other data that may be received includes a speaker ID of the user 5 and/or an account ID of a user account associated with the speech-detection device 110. Other data may include a relative position of the user 5 to the speech-detection device 110. Other types of data may also be received by the resource scheduling component 182.

The resource scheduling component 182 then uses the metadata to process the resource scheduling request. In one embodiment, the speech-detection device 110 processes the audio data to determine an intent associated with the utterance and the resource scheduling component 182 to satisfy the intent. The resource scheduling component 182 determines an availability of each meeting room associated with the device ID and the set of device IDs. The resource scheduling component 182 schedules an available meeting room based on the availability, the available meeting room being in proximity to the location of the speech-detection device 110. The resource scheduling component 182 can output to the speech-detection device 11001 an audio confirmation of scheduling the available meeting room. In other embodiments, the resource scheduling component 182 can also output additional data than just the audio confirmation, such as data that includes directions to the scheduled meeting room, details regarding the meeting room, or the like. The resource scheduling component 182 may also prompt the user for additional information, such as additional participants to invite to the scheduled meeting room, or the like. This additional data can be sent in audio form or can be sent in an email or other message to the requester of the meeting room and/or to other participants, if any, for the scheduled meeting. Although the resource described in this embodiment is a meeting room, in other embodiments other resources that can be scheduled can be the subject of the resource scheduling component 182.

In a further embodiment, the resource scheduling component 182 can update a calendar associated with the available meeting room. In another embodiment, the resource scheduling component 182 or another component (e.g., speech processing component 198) can process the audio data to determine a speaker ID associated with a speaker of the utterance and update a calendar associated with the speaker ID. It should be noted that the speaker ID can be the same or different from a meeting owner ID. The meeting owner ID can designate an organizer of a meeting being scheduled. The resource scheduling component 182 can use the speaker ID, the meeting owner ID, or both, when scheduling the resources as described herein.

In addition to accommodating a request to schedule a meeting room, a user 5 can say an additional constraint on the request, such as a timing constraint, a participant constraint (e.g., a minimum or maximum number of participants), a location constraint, an equipment constraint, or the like. For example, the user 5 may say "book a meeting room with a projector." The speech-detection device 110 can process the audio data to determine an intent to schedule a meeting room with the equipment constraint of a meeting room with a projector. The equipment constraint may be included in the entity data (also referred to herein as slot data), in metadata, or both. In one embodiment, the resource scheduling component 182 processes the audio data to determine an equipment constraint associated with the intent. When determining the availability of each meeting room, the resource scheduling component 182 determining the availability of each meeting room associated with the device IDs in view of the equipment constraint. The resource scheduling component 182 schedules the available meeting room that meets the equipment constraint. Similarly, the constraint may be a timing constraint that may limit the available meeting rooms. The location constraint may include a specific floor, a specific quadrant, a specific zone, or even a restricted access location for which additional authentication or authorization operations may need to be performed. Additionally, historical data can be used to provide an additional constraint. For example, if a user historically schedules a certain meeting room, the meeting room can be given priority in scheduling, if available.

In another embodiment, the speech-detection device 110 can determine the intent to schedule a resource and add the context of nearby devices (e.g., metadata containing the device IDs of the other devices discovered by the speech-detection device 110). The speech-detection device 110 can generate a directive to send to a compute service, such a Lambda function. The Lambda function can receives the directive and parse the directive to determine which of the nearby devices associated with resources can be scheduled and which of these resources are available. The Lambda function can send a message to a device cloud that manages the resources to schedule the resource. For example, the speech-detection device 110 or the Lambda function can use a calendar API to find a meeting room, such as an endpoint ID or message identifier. The device cloud can respond with an event that the resource is scheduled and send it back to the Lambda function or the speech-detection device 110 itself. Alternatively, a back-end service can be used instead of a Lambda function. In further embodiments, additional interfaces to specific devices in a scheduled meeting room can be used to control those devices.

In another embodiment, the speech-detection device 110 detects a user by analyzing a voice fingerprint to update a user's calendar when the resource is scheduled. The speech-detection device 110 can also update a calendar associated with the resource (e.g., a meeting room). The speech-detection device 110 can detect its own location and find out location of nearby neighbor devices in its mesh network (or even outside the mesh network). The speech-detection device 110 can detect all or up to a fixed number of nearby devices and send their information to the web service. The speech-detection device 110 can include a wireless mesh network hub (e.g., ZigBee® hub) to communicate with other devices on the mesh network. The list of nearby devices could be determined in response to a device discovery process when forming the mesh network. The speech-detection device 110 can filter all of the devices to a subset based on one or more constraints, one or more parameters, or the like. The speech-detection device 110 can also further limit the list with additional information in the audio data, such as an intent to schedule a meeting room with a certain size, within a certain proximity, within a zone, with certain equipment (e.g., AV equipment). The web service can determine the availability of the nearby devices identified by the speech-detection device 110. The web service may also provide additional optimizations on scheduling a resources, such as accessing user profiles, device profiles, organization profiles, or the like to further tune which resources can are scheduled in response to the audio request. The web service can also determine a relative location between each of the devices for intelligent scheduling based on the context of the audio request at the speech-detection device 110.

Figure 2:
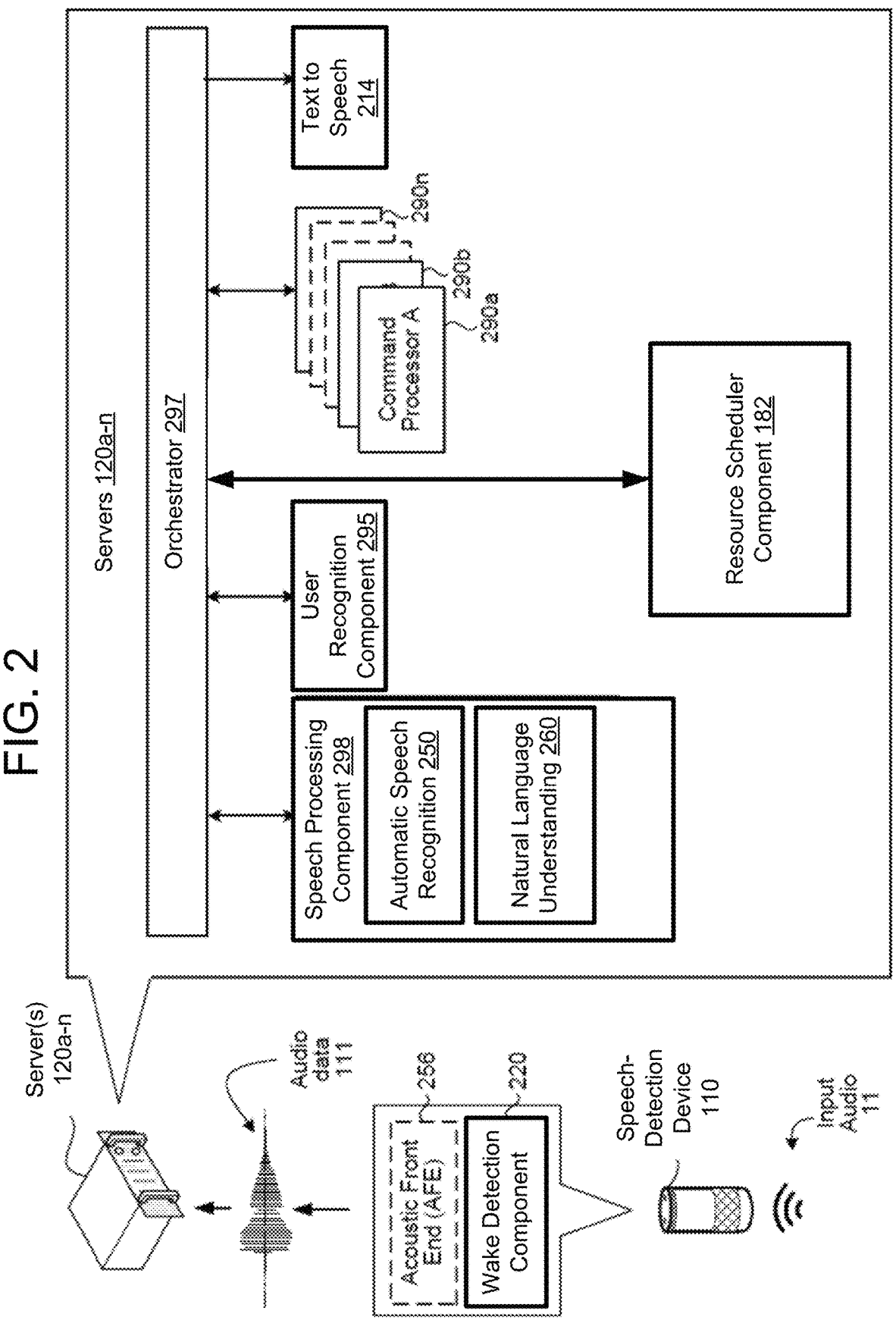
FIG. 2 is a diagram of components of a speech processing system according to embodiments of the present disclosure.
Figure 3:
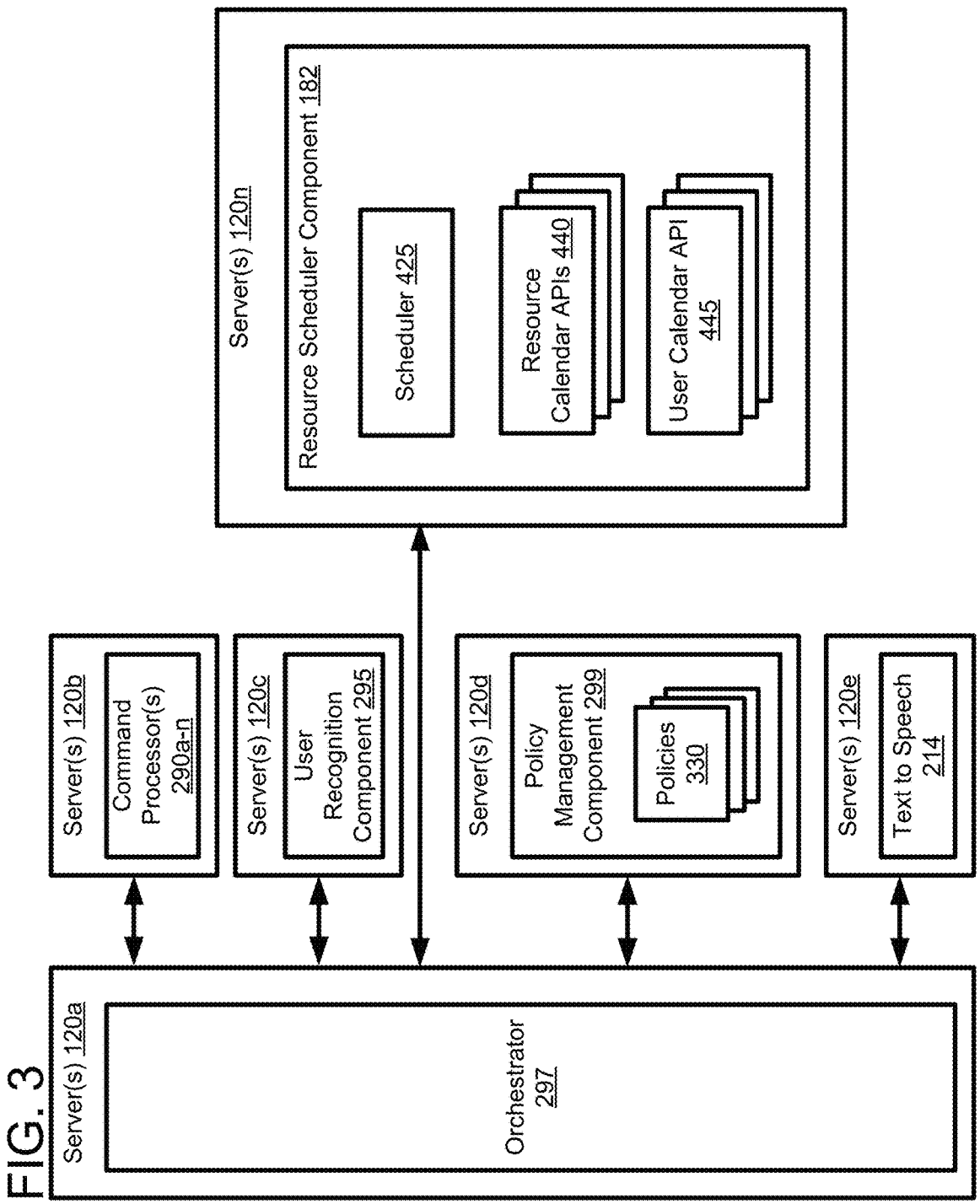
FIG. 3 is diagram of a resource scheduling component for a speech processing system according to embodiments of the present disclosure.

The system 100 may operate using various speech processing components as described in FIGS. 2-3. The various components illustrated may be located on the same and/or different physical devices. Communication between various components illustrated in FIGS. 2-3 may occur directly and/or across a network(s) 199.

Referring to FIG. 2, an audio capture component, such as a microphone (or array of microphones) of the speech-detection device 110, captures input audio 11 corresponding to a spoken utterance. The speech-detection device 110, using a wakeword detection component 220, processes audio data corresponding to the input audio 11 to determine if a keyword (such as a wakeword) is detected in the audio data. Following detection of a wakeword, the speech-detection device 110 sends audio data 111, corresponding to the utterance, to a server(s) 120a-n for processing. The audio data 111 may be output from an acoustic front end (AFE) 256 located on the speech-detection device 110 prior to transmission, or the audio data 111 may be in a different form for processing by a remote AFE.

The wakeword detection component 220 works in conjunction with other components of the speech-detection device 110, for example a microphone, to detect keywords in audio data corresponding to the input audio 11. For example, the speech-detection device 110 may convert input audio 11 into audio data, and process the audio data with the wakeword detection component 220 to determine whether speech is detected, and if so, if the audio data comprising speech matches an audio signature and/or model corresponding to a particular keyword.

Once speech is detected in the audio data, the speech-detection device 110 may use the wakeword detection component 220 to perform wakeword detection to determine when a user intends to speak a command to the speech-detection device 110. This process may also be referred to as keyword detection, with the wakeword being a specific example of a keyword. Specifically, keyword detection is typically performed without performing linguistic analysis, textual analysis, and/or semantic analysis. Instead, audio data is analyzed to determine if specific characteristics of the audio data match preconfigured acoustic waveforms, audio signatures, and/or other data to determine if the incoming audio data "matches" stored audio data corresponding to a keyword. Other techniques for wakeword detection, such as those known in the art, may also be used.

Once the wakeword is detected in the audio data, the speech-detection device 110 may "wake" and begin transmitting audio data 111 corresponding to input audio 11 to server 120a for speech processing (e.g., for purposes of executing a command in the speech). The audio data 111 may include data corresponding to the wakeword, and/or the portion of the audio data corresponding to the wakeword may be removed by the speech-detection device 110 prior to sending the audio data 111 to the server(s) 120a-n. The audio data 111 may additionally include a voice command, question, and/or other utterance.

Upon receipt by the server 120a-n, an orchestrator 297 (also referred to as an orchestrator component) sends the audio data 111 to a speech processing component 298, and namely an ASR component 250 of the speech processing component 298. The ASR component 250 transcribes the audio data 111 into text data representing words of speech contained in the audio data 111. The text data may then be used by other components for various purposes, such as executing system commands, inputting data, etc. A spoken utterance in the audio data 111 is input to logic configured to perform ASR, which then interprets the spoken utterance based on a similarity between the spoken utterance and pre-established language models stored in an ASR model knowledgebase. For example, the ASR component 250 may compare the audio data 111 with models for sounds (e.g., subword units and/or phonemes) and sequences of sounds to identify words that match the sequence of sounds spoken in the utterance of the audio data 111.

The different ways a spoken utterance may be interpreted may each be assigned a respective probability/confidence score representing a likelihood that a particular set of words matches those spoken in the utterance. The confidence score may be based on a number of factors including, for example, a similarity of the sound in the spoken utterance to models for language sounds, and a likelihood that a particular word that matches the sound would be included in the sentence at the specific location (e.g., using a language model). Thus, each potential textual interpretation of the spoken utterance (i.e., hypothesis) may be associated with a confidence score. Based on the considered factors and the assigned confidence score, the ASR component 250 outputs the most likely text data corresponding to the audio data 111. The ASR component 250 may also output multiple hypotheses in the form of a lattice and/or an N-best list with each hypothesis corresponding to a confidence score and/or other score (e.g., such as probability scores, etc.).

The ASR component 250 may include an AFE and a speech recognition engine. The AFE transforms audio data 111 into data for processing by the speech recognition engine. The speech recognition engine compares the speech recognition data with acoustic models, language models, and other data models and information for recognizing the speech conveyed in the audio data 111. The AFE may reduce noise in the audio data 111 and divide the digitized audio data 111 into frames representing time intervals for which the AFE determines a number of values (i.e., features) representing qualities of the audio data 111, along with a set of those values (i.e., a feature vector and/or audio feature vector) representing features/qualities of the audio data 111 within each frame. Many different features may be determined, as known in the art, and each feature represents some quality of the audio data 111 that may be useful for ASR processing. A number of approaches may be used by the AFE to process the audio data 111, such as mel-frequency cepstral coefficients (MFCCs), perceptual linear predictive (PLP) techniques, neural network feature vector techniques, linear discriminant analysis, semi-tied covariance matrices, and/or other approaches known to those skilled in the art.

The speech recognition engine attempts to match received feature vectors to language phonemes and words as known in the stored acoustic models and language models. The speech recognition engine computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output text data representing speech that makes sense grammatically.

Following ASR processing, the ASR results (i.e., text data representing speech) may be sent to the orchestrator 297 and/or other processing components, which may be local to the device performing ASR and/or distributed across the network(s) 199. For example, ASR results in the form of a single textual representation of the speech, an N-best list including multiple hypotheses and respective scores, lattice, etc. may be sent from the ASR component 250 to an NLU component 260 directly and/or indirectly through the orchestrator 297.

The device performing NLU processing (e.g., the server 120a) may include various components, including potentially dedicated processor(s), memory, storage, etc. The device performing NLU processing may include a dedicated NLU component 260, which may include a named entity recognition (NER) component that determines entities from received text of utterances and an intent classification (IC) component that determines user intent from text of utterances. The device performing NLU processing may additionally include NLU storage, and a knowledgebase (not illustrated). The knowledgebase is a database and/or other information storage that may include information about entities that may be used in resolving spoken utterances. The NLU component 260 may also utilize gazetteer information stored in an entity library storage. The knowledgebase and/or gazetteer information may be used for entity resolution, for example matching ASR results with different entities (e.g., song titles, contact names, etc.). Gazetteers may be linked to users (e.g., a particular gazetteer may be associated with a specific user's music collection), may be linked to certain domains (e.g., shopping), and/or may be organized in a variety of other ways. Domain, as used herein, may refer to a category of content, such as music, videos, weather, etc. Each domain may be associated with a particular component. For example, a music component may be associated with a music domain, a video component may be associated with a video domain, a weather component may be associated with a weather domain, and so on.

The NLU component 260 takes text data (e.g., output from the ASR component 250) and attempts to make a semantic interpretation of the text data. That is, the NLU component 260 determines the meaning behind the text data based on the individual words and then implements that meaning. The NLU component 260 interprets a text string to derive an intent data and/or a desired action from the user as well as the pertinent pieces of information in the text data that allow a device (e.g., the speech-detection device 110, the server(s) 120a-n, etc.) to complete that action (e.g., entity data associated with the intent data). For example, if a spoken utterance is processed using the ASR component 250, which outputs the text data "play Katy Perry," the NLU component 260 may determine the user intended to activate a music component in order for the music component to play music by Katy Perry.

The NLU component 260 may be configured to parse and tag to annotate text data as part of NLU processing. For example, for the text data "play Katy Perry," the NLU component 260 may tag "play" as a command (e.g., to execute a music component to play music) and may tag "artist: Katy Perry" as a specific entity and target of the command. The command may be referred to as "intent data" and the subject of the intent data may be "entity data." Additional metadata can be combined with the intent data and the entity data, as described herein.

To correctly perform NLU processing of an utterance, the NLU component 260 may be configured to determine a "domain" of the utterance so as to determine and narrow down which components offered by an endpoint device (e.g., the server(s) 120a-n, the speech-detection device 110, etc.) may be relevant. For example, an endpoint device may offer components relating to interactions with a telephone component, a contact list component, a calendar/scheduling component, a music player component, a verification component, a knowledgebase component, a news component, a video component, etc. Words in text data may implicate more than one component, and some components may be functionally linked (e.g., both a telephone component and a calendar component may utilize data from the contact list).

The NLU component 260 receives an utterance in the form of ASR results and attempts to identify relevant grammars and lexical information that may be used to construe meaning. To do so, the NLU component 260 may begin by identifying potential domains that may relate to the received utterance. The NLU component 260 may have access to a database of domains associated with specific devices. For example, the speech-detection device 110 may be associated with domains for music, telephony, calendaring, contact lists, knowledgebase, skills, videos, and device-specific communications. In addition, the entity library may include database entries about specific components on a specific device, either indexed by device ID, user ID (e.g., speaker ID), household ID, organization ID, and/or some other indicator.

A domain may represent a discrete set of activities having a common theme, such as "news", "music", "skills", "videos," etc. As such, each domain may be associated with a particular language model and/or grammar database, a particular set of intents/actions, and/or a particular personalized lexicon. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both news and music, the utterance may be NLU processed using the grammar models and lexical information for news, and may also be processed using the grammar models and lexical information for music. The responses to the spoken utterance produced by each set of models is scored, with the overall highest ranked result from all applied domains being ordinarily selected to be the correct result.

The NLU component 260 may parse the utterance to determine an intent(s) for each identified domain, where the intent(s) corresponds to the action to be performed that is responsive to the spoken utterance. Each domain is associated with a database of words linked to intents. For example, a music intent database may link words and phrases such as "quiet," "volume off," and "mute" to a "mute" intent. The NLU component 260 identifies potential intents for each identified domain by comparing words in the utterance to the words and phrases in an intents database.

In order to generate a particular interpreted response, the NLU component 260 applies the grammar models and lexical information associated with the respective domain. Each grammar model includes the names of entities (i.e., nouns) commonly found in speech about the particular domain (i.e., generic terms), whereas the lexical information from the gazetteer is personalized to the user and/or the device. For instance, a grammar model associated with a music domain may include a database of music content available to a particular user account.

The intent data identified by the NLU component 260 are linked to domain-specific grammar frameworks (included in grammar models) with "slots" or "fields" to be filled. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NLU component 260 may parse the spoken utterance to identify words as subject, object, verb, preposition, etc., based on grammar rules and models, prior to recognizing named entities. The identified verb may be used by the NLU component 260 to identify intent, which is then used by the NLU component 260 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NLU component 260 then searches the corresponding fields in the domain-specific and personalized lexicon(s), attempting to match words and phrases in the utterance tagged as a grammatical object and/or object modifier with those identified in the database(s).

In an example, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the NLU component 260 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent data are then used to determine what database fields should be searched to determine the meaning of these phrases, such as searching a user's gazetteer for similarity with the framework slots. So a framework for a "play music" intent data might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NLU component 260 may search the database of generic words associated with the domain. For instance, if the utterance was "play songs by the rolling stones," after failing to determine an album name or song name called "songs" by "the rolling stones," the NLU component 260 may search the domain vocabulary for the word "songs."

The results of NLU processing may be tagged to attribute meaning to the utterance. For example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG. The results from the NLU component 260 may therefore include intent data, entity data and/or a component ID of a component (or a command processor associated with a component) that can satisfy the intent represented by the intent data and/or entity data. In some embodiments, the intent data is associated with a specific component and/or command processor 290a-n.

The output from the ASR component 250 may also be sent to a user recognition component 295 either directly and/or indirectly through the orchestrator 297. Alternatively, the user recognition component 295 may be implemented as part of the ASR component 250. The user recognition component 295 performs user recognition using the audio data 111, and optionally the ASR component output. The user recognition component 295 may include a scoring component that determines respective scores indicating whether the input utterance in the audio data 111 was spoken by particular users. The user recognition component 295 may also include a confidence component that determines an overall confidence as to the accuracy of user recognition operations. User recognition may involve comparing speech characteristics in the audio data 111 to stored speech characteristics of users. User recognition may also involve comparing biometric data (e.g., fingerprint data, iris data, etc.) received by the user recognition component 295 (e.g., from speech-detection device 110) to stored biometric data of users. User recognition may further involve comparing image data including a representation of a feature of a user (e.g., as received from a camera of the speech-detection device 110) with stored image data including representations of features of users. It should be appreciated that other kinds of user recognition processes, including those known in the art, may be used.

Output from the NLU processing, which may include tagged text data, commands, intent data, entity data, a component ID, etc., and output of the user recognition component 295 (e.g., a unique ID of a user) may be sent to a command processor 290a-n, which may be located on a same and/or separate server 120a-n as part of the system 100. The system 100 may include more than one command processor 290a-n, and the command processor(s) 290a-n may be determined based on the NLU output. For example, if the NLU output includes a command to play music, the command processor 290a-n selected may correspond to a music playing application and/or music component, such as one located on the speech-detection device 110 and/or in a music playing appliance. In another example, if the NLU output includes a command to read an article about a topic, the command processor 290a-n selected may correspond to a news domain and/or news component. Many such command processors 290a-n may be available to the system 100 depending on the various applications that may be invoked. In some embodiments, a music command processor may be associated with a music component, a news command processor may be associated with a news component, a skills command processor may be associated with a skills component, a knowledgebase command processor may be associated with a knowledgebase component, a video command processor may be associated with a video component, and so on.

Output from the NLU component 260 (and optionally the user recognition component 295) may be sent to a command processor(s) 290a-n/skill either directly and/or indirectly via the orchestrator 297. A "skill" may correspond to a domain and may be software running on a server and/or device akin to an application. That is, a skill may enable a server to execute specific functionality in order to provide data and/or produce some other output called for by a user. The system may be configured with more than one skill. For example a weather component skill may enable a server to execute a command with respect to a weather component server, a car component skill may enable a server to execute a command with respect to a taxi component server, an order pizza skill may enable a server to execute a command with respect to a restaurant server, a verification skill may enable a server to execute a command with respect to a verification component, etc. A skills command processor may include logic to select an appropriate skill for handling a received intent data and entity data.

A command processor 290a-n may output text that is to be spoken to a user via speech-detection device 110. Alternatively, a command processor 290a-n may receive text from, for example, a particular component, where the text is to be spoken to a user via speech-detection device 110. The command processor 290a-n provides the text to a text to speech (TTS) component 214, which converts the text into speech (e.g., into an audio file that contains a spoken version of the content of the text). This audio file may be, for example, a Moving Picture Experts Group Audio Layer III (MP3) audio file and/or other type of compressed or uncompressed audio file. The audio file is sent to the speech-detection device 110 and then played by the speech-detection device 110. In some embodiments, a link to the audio file (e.g., a universal resource locator (URL)) is sent to the speech-detection device, and the speech-detection device 110 accesses the link to receive the audio file.

Output from the NLU component 260 (and optionally the user recognition component 295) may be sent to a resource scheduling component 182. The output may include a schedule a nearby resource request 190. The schedule a nearby resource request 190 may include intent data, entity data, and metadata as described herein. The intent data may specify or include an intent to schedule a resource that is nearby the speech-detection device 110. The entity data may include additional data extracted from the audio data 111. The resource scheduling component 182 may additionally receive metadata associated with the audio data 111, which may include a device ID of speech-detection device 110, a timestamp indicating when the input audio 11 was received and/or when the audio data 111 was generated, and so on. The metadata may also include a location of the speech-detection device 110 and a list of zero or more nearby devices discovered by the speech-detection device 110. The speech-detection device 110 may additionally include one or more biometric sensors, such as a fingerprint reader, a retinal scanner, a video camera, and so on, which may collect biometric information including a user fingerprint, a user retinal map, an image of the user, and so on. Such biometric data may be sent by speech-detection device 110 to servers 120a-n, and may be received by resource scheduling component 182. Additionally, system 100 may include an additional component (not shown) that determines a relative position of the user 5 to the speech detection device 110 based on location information of the user (e.g., of a mobile device of the user) and the speech-detection device, based on time of flight information for signals between a mobile device on the user 5 and the speech-detection device 110, based on the audio data 111, and/or based on other information. Such relative position information may also be received by resource scheduling component 182. Additionally, speech-detection device 110 may include a GPS receiver that is usable to determine a location of the speech-detection device. Alternatively, or additionally, speech-detection device may obtain other location information, such as an IP address of a network to which the speech-detection device is connected. Any such location information may be sent to servers 120a-n, and may be received by resource scheduling component 182.

The resource scheduling component 182 receives intent data including an intent to schedule a resource located in proximity to a location of a speech-detection device. The resource scheduling component 182 also receives metadata including a location and a device ID of the speech-detection device 110 and a set of one or more device IDs associated with one or more devices discovered by the speech-detection device 110. Each of the set of one or more device IDs and the device ID is associated with a resource that can be scheduled. The other device IDs may correspond to other speech-detection devices or other networked devices that are associated with resources that can be scheduled by the resource scheduling component 182. The resource scheduling component 182 determines an availability of each resource associated with the set of one or more device IDs and the device ID and schedules one of the resources associated with the set of one or more device IDs and the device ID based on the availability to obtain a scheduled resource. The scheduled resource is located in proximity to the location of the speech-detection device. The resource scheduling component 182 can output to the speech-detection device 110 an audio confirmation of the scheduled resource. In some embodiments, the speech-detection device 110 communicates with the other devices using a short-range wireless mesh network standard such as the ZigBee® standard.

In a further embodiment, the resource scheduling component 182 receives, from the speech-detection device 110, audio data representing an utterance corresponding to the intent data and the metadata. The resource scheduling component 182 processes the audio data to determine the intent associated with the utterance. The resource scheduling component 182 determines the metadata associated with the utterance.

In another embodiment, to determine the metadata, the resource scheduling component 182 retrieves the location and device ID from a profile associated with the speech-detection device 110. The profile can be stored locally on the speech-detection device 110 or can be stored remotely. The resource scheduling component 182 retrieves from a radio configuration table the set of one or more device IDs associated with one or more devices discovered by the speech-detection device 110. The radio configuration table may be stored in response to a discovery process performed by the speech-detection device 110.

In one embodiment, the resource scheduling component 182 determines the availability of each resource by accessing a calendar associated with each of the respective device IDs. In a further embodiment, the resource scheduling component 182 receives from the speech-detection device 110, audio data representing an utterance corresponding to the intent data and the metadata. The resource scheduling component 182 processes the audio data to determine a time constraint, an equipment constraint, or both, associated with the intent for scheduling the resource. To determine the availability in view of the time constraint, the resource scheduling component 182 access a calendar associated with the respective device ID and determines availability in the calendar in view of the specified time constraint (e.g., the scheduled resource meets the time constraint). The time constraint may be a specified time (absolute or relative time), a start time, as well as a start time and duration. To determine the availability in view of the equipment constraint, the resource scheduling component 182 accesses a profile associated with the respective device ID and determines availability in the calendar for only those resources that meet the equipment constraint. In another embodiment, to determine the availability of each resource in view of the equipment constraint, the resource scheduling component 182 filters the set of device IDs and the device ID of the speech-detection device 110 based on the equipment constraint to obtain a subset of IDs. The resource scheduling component 182 accesses a calendar associated with each of the subset of IDs to determine an availability of the respective resource that meets the equipment constraint.

In other embodiments, the resource scheduling component 182 receives authentication credentials associated with the device ID and authenticates the device IC in view of the authentication credentials.

In another embodiment, the resource scheduling component 182 schedules the scheduled resource by updating a calendar associated with the scheduled resource. The resource scheduling component 182 may also receive, from the speech-detection device 110, audio data representing an utterance corresponding to the intent data and the metadata. The resource scheduling component 182 processes the audio data to determine a speaker ID associated with a speaker of the utterance and updates a calendar associated with the speaker ID.

In other embodiments, additional constraints may be added to the intent to schedule a meeting room nearby, such as a name of another participant in the meeting. A profile may also be associated with a speaker ID and may include user preferences, additional constraints, a list of attendees to be notified to the scheduled resource, or the like.

FIG. 3 is diagram of one example implementation of system 100 that includes a resource scheduling component 182 according to embodiments of the present disclosure. As shown, servers 120a-n are divided into servers 120a, 120b, 120c, 120e, and 120n. Server 120a includes orchestrator 297, server 120b includes one or more command processors 190a-n, server 120c includes user recognition component 295, server 120d includes policy management component 299, server 120e includes TTS component 214 and server 120n includes resource scheduling component 182. In other embodiments the various components may be divided across the servers in other arrangements, and more or fewer servers may be used. Additionally each of servers 120a, 120b, 120c, 120d, 120e, and 120n may constitute multiple servers, such as a cluster of servers.

Orchestrator 297, command processors 290a-n, user recognition component 295, TTS component 214, policy management component 299 and resource scheduling component 182 may communicate via networks 199 in embodiments. In one embodiment, resource scheduling component 182 includes a scheduler 425 to access calendars to determine the availability of resources using one or more resource calendar application programming interfaces (APIs) 440. The schedule 425 may also access calendars of particular users, such as when the metadata includes a speaker ID as described herein. As discussed above, the metadata may include a device ID, a speaker ID, a component ID (or command processor ID), an account ID, a timestamp, biometric data (e.g., fingerprint, retinal scan, facial image, etc.), relative position of the user 5 to the speech detection device 110, location information (e.g., GPS location, IP address, etc.), and/or other data. Also, to schedule a nearby resource, the metadata may also include a list of one or more device IDs corresponding to devices detected by the speech-detection device 110, such as during a device discovery process for a mesh network standard.

Policy management component 299 may have multiple policies 330. Policies 330 may be associated with particular organizations, particular speech-detection devices, and/or particular users. Policies 330 may control one or more operations to perform when particular speech-detection devices and/or particular users are used in scheduling a resource. Policies 330 may be set by a user and/or an administrator. Policies 330 may be static policies that always perform the same operation when activated. Alternatively, policies 330 may be dynamic policies which may include internal logic that determines whether to perform actions based on a current set of conditions. For example, dynamic policies may include if-then statements and/or Boolean logic. Policies 330 may include additional information that can be used as constraints for particular users or particular speech-detection devices. For example, policies 330 may specify a zone (e.g., a quadrant of a building, a floor of a building, or the like) in which resources can be scheduled. For example, a user may request from a speech-detection device to schedule a meeting room. Although the speech-detection device has discovered multiple devices on multiple floors of a building, the policies 330 may specify which speech-detection devices are located on a same floor as the speech-detection device trying to schedule a resource. This additional information from the policies 330 may be used to filter the list of speech-detection devices for purposes of scheduling a resource.

In one embodiment, policy management component 299 determines when to activate a static policy associated with a user or speech-detection device based on notifications from resource scheduling component 182. Once activated, the static policy may perform one or more actions, such as sending a calendar invite to the requesting users to place the scheduling resource on the user's calendar, generating a notification to be sent to a user account associated with the speech-detection device, generating a notification to be sent to an administrator, placing a user associated with the request on the calendar of the scheduled resource, or the like.

In some embodiments, when a new user interaction is detected a query is made to the policy management component 299. The policy management component 299 may then determine whether an active policy is associated with a user and/or speech-detection device associated with the new user interaction. If an active policy is associated with the new user interaction, then policy management component 299 may determine whether the interaction should include additional metadata, such as additional constraints or preferences in scheduling the resource, whether the interaction is permitted by the user and/or the speech-detection device. For example, policy management component 299 may determine whether intent data and/or entity data (and/or a component that can satisfy an intent from the intent data) are permitted by the policy 330 by the particular speaker ID. If the requested action (e.g., as represented in the intent data, entity data, component, etc.) are not permitted, then an error message may be generated and output to the speech-detection device.

Figure 4:
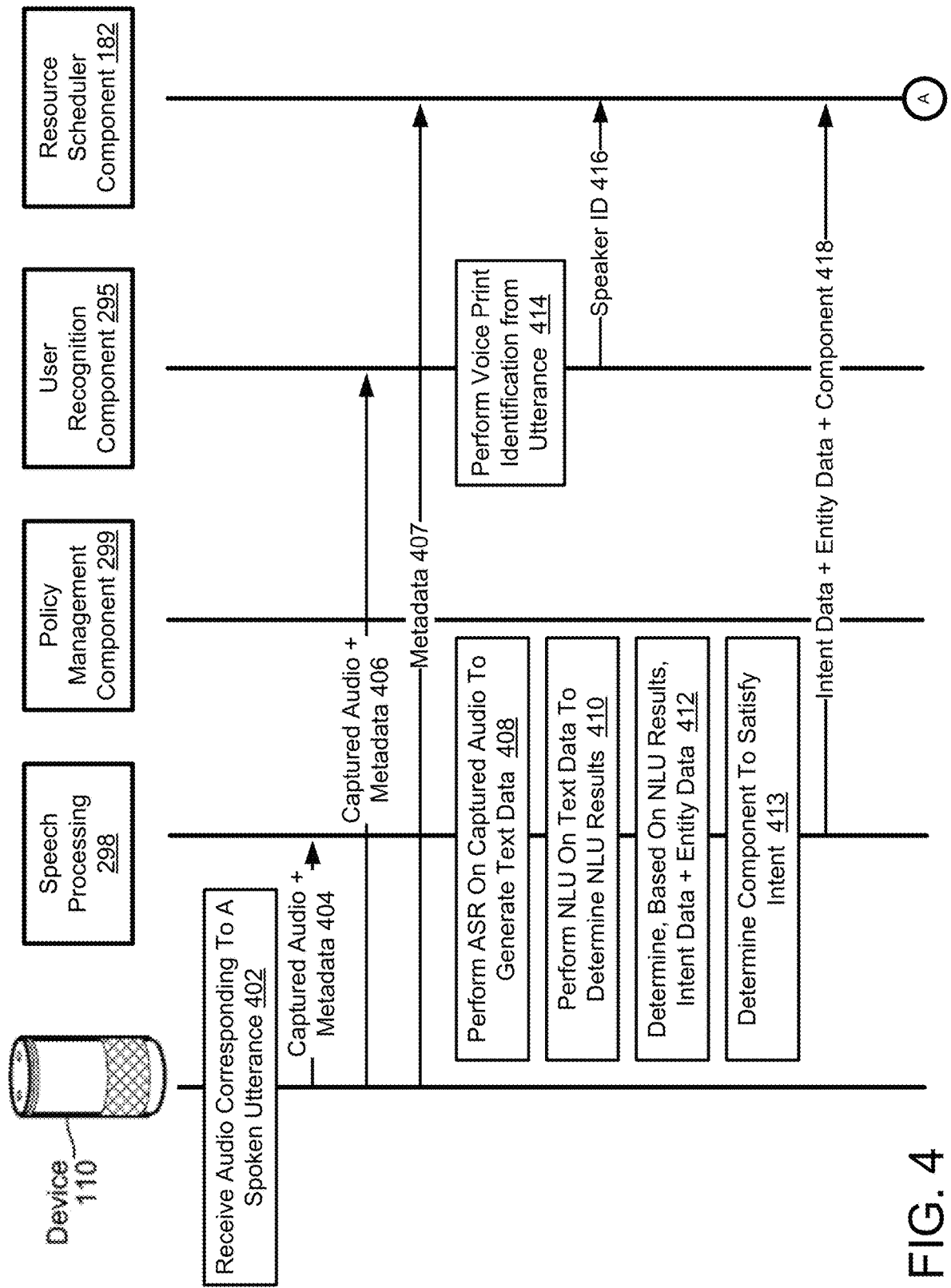
FIGS. 4-5 are sequence diagrams illustrating resource scheduling based on audio data from a speech-detection device, in accordance with embodiments of the present disclosure.
Figure 5:
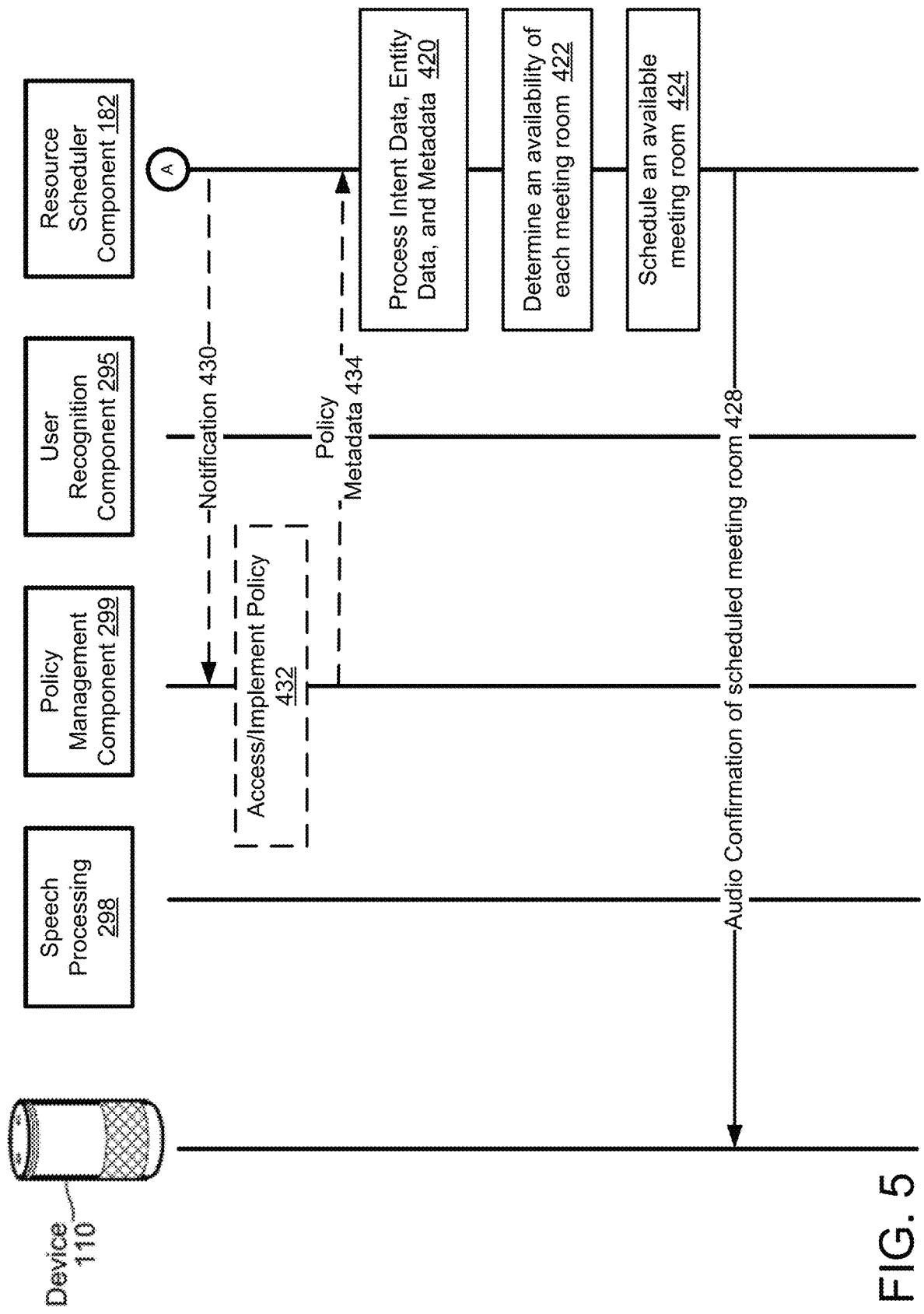

FIGS. 4-5 are sequence diagrams illustrating resource scheduling, in accordance with embodiments of the present disclosure. To initiate the sequence, device 110 receives audio corresponding to a spoken utterance from a user at block 402. The spoken utterance may include a wakeword that causes the device 110 to wake and to start sending (e.g., streaming) captured audio data and associated metadata (e.g., timestamp, location information, device ID, a list of device IDs for nearby devices in the mesh network, etc.) to a server computing device that includes speech processing component 298. Device 110 then sends the captured audio to speech processing component 298 at block 404. The captured audio and metadata may also be sent to a user recognition component 295 at block 406. The metadata may also be sent to a resource scheduling component 182 at block 407.

At block 408 the speech processing component 298 performs ASR on the captured audio to generate text data (e.g., to generate text data comprising the text, "Katy Perry"). The speech processing component 298 transcribes the captured audio data into text data representing words of speech contained in the audio data. In some embodiments, a spoken utterance in the audio data is input to a processor configured to perform ASR, which then interprets the spoken utterance based on a similarity between the spoken utterance and pre-established language models stored in an ASR model knowledgebase. For example, the speech processing component 298 may compare the audio data with models for sounds (e.g., subword units and/or phonemes) and sequences of sounds to identify words that match the sequence of sounds spoken in the utterance of the audio data.

At block 410, the speech processing component 298 performs NLU on the text data to determine NLU results. In some embodiments, speech processing component 298 takes text data and attempts to make a semantic interpretation of the text data. That is, the speech processing component 298 determines the meaning behind the text data based on the individual words. The speech processing component 298 interprets a text string to derive an intent data and/or a desired action as well as the pertinent pieces of information in the text data (e.g., entity data associated with the intent data) that enable the desired action to be completed.

To correctly perform NLU processing of an utterance, the speech processing component 298 may determine one or more "domain" of the utterance so as to determine and narrow down which components may be relevant. Text data for an utterance may be processed applying the rules, models, and information applicable to each identified domain. For example, if text data potentially implicates both news and music, the text data may be NLU processed using the grammar models and lexical information for news, and may also be processed using the grammar models and lexical information for music. The responses to the text data associated with the spoken utterance produced by each set of models is scored, with the overall highest ranked result from all applied domains being ordinarily selected to be the correct result. Alternatively, multiple highest ranked results may be selected.

At block 412 the speech processing component 298 may determine, based on the NLU results, intent data, and entity data. In some embodiments, speech processing component 298 parses the text data to determine intent data for each identified domain, where the intent data corresponds to the action to be performed that is responsive to the spoken utterance. The speech processing component 298 may identify potential intents for each identified domain by comparing words in the utterance to the words and phrases in an intents database. The entity data and/or entity data may include an indication (e.g., a component ID) of a component that can satisfy an intent represented by the intent data (or represented by a combination of the intent data and the entity data).

At block 413, speech processing component 298 may determine a component that can satisfy a user intent represented by the intent data, or by a combination of the intent data and the entity data. For example, a music component may be determined if the intent is "play music" and the entity data is "album Back in Black." Alternatively, the intent data may be associated with a specific component and/or command processor, and a separation determination of the component that will satisfy the intent is not performed.

At block 418, the speech processing component sends the intent data, the entity data and/or an identifier (e.g., component ID) of the determined component that can satisfy the user intent to resource scheduling component 182.

At block 414, user recognition component 295 performs voice print identification from the utterance to determine a speaker ID associated with a user who voiced the utterance. At block 416, the user recognition component 295 may send the speaker ID to the resource scheduling component 182.

At block 420, the resource scheduling component 182 processes the metadata from block 407, the speaker ID from block 416 and/or the intent data, entity data and/or component ID from block 418. The metadata associated with the utterance may include at least one of a device identifier of the speech-detection device 110 or a location of the speech-detection device 110 and a set of device IDs. Each device ID of the set corresponds to another device located in proximity to the location of the speech-detection device 110 and that communicates with the speech-detection device 110 using a short-range wireless mesh network standard. At block 422, the resource scheduling component 182 determines an availability of each meeting room associated with each of the device ID and the set of device IDs. At block 424, the resource scheduling component 182 schedules an available meeting room based on the availability, the available meeting room being in proximity to the location of the speech-detection device. At block 426, the resource scheduling component 182 outputs to the speech-detection device an audio confirmation 428 of scheduling the available meeting room. Alternatively, other resources than meeting rooms can be scheduled at block 424.

In another embodiment, as also illustrated in dashed lines in FIG. 4, the resource scheduling component 182 may generate a notification 430 that a request to schedule a resource has been received and send the notification 430 to the policy management component 299. The notification may include the device IDs, the speaker IDs, or the like to access any associated policies. Optionally at block 432, the policy management component 299 access a policy associated with the speaker ID, devices IDs and sends any policy metadata 434 back to the resource scheduling component 182.

Figure 6:
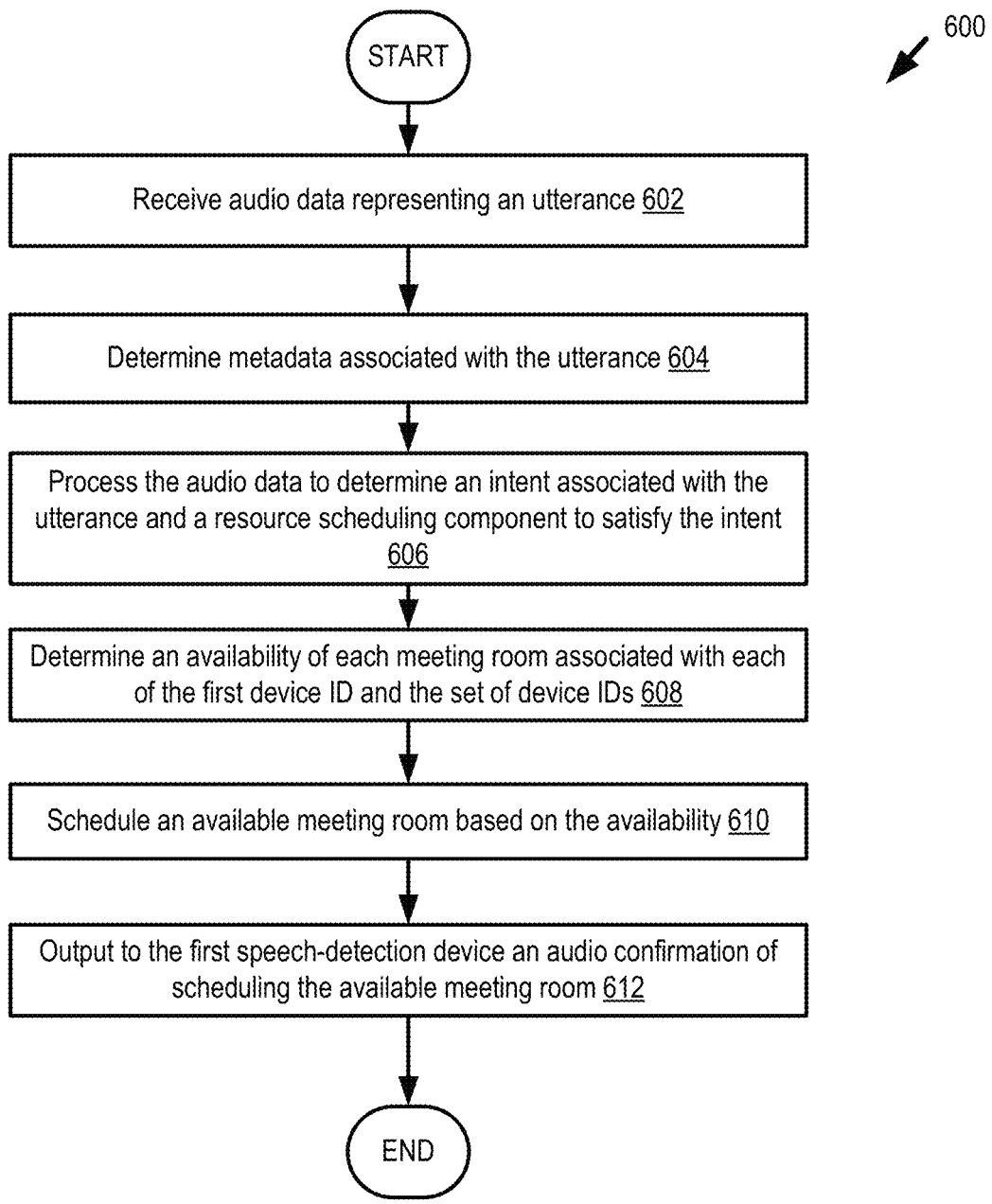
FIG. 6 is a flow diagram illustrating a method for scheduling a nearby meeting room using a speech-detection device according to embodiments of the present disclosure.
Figure 7:
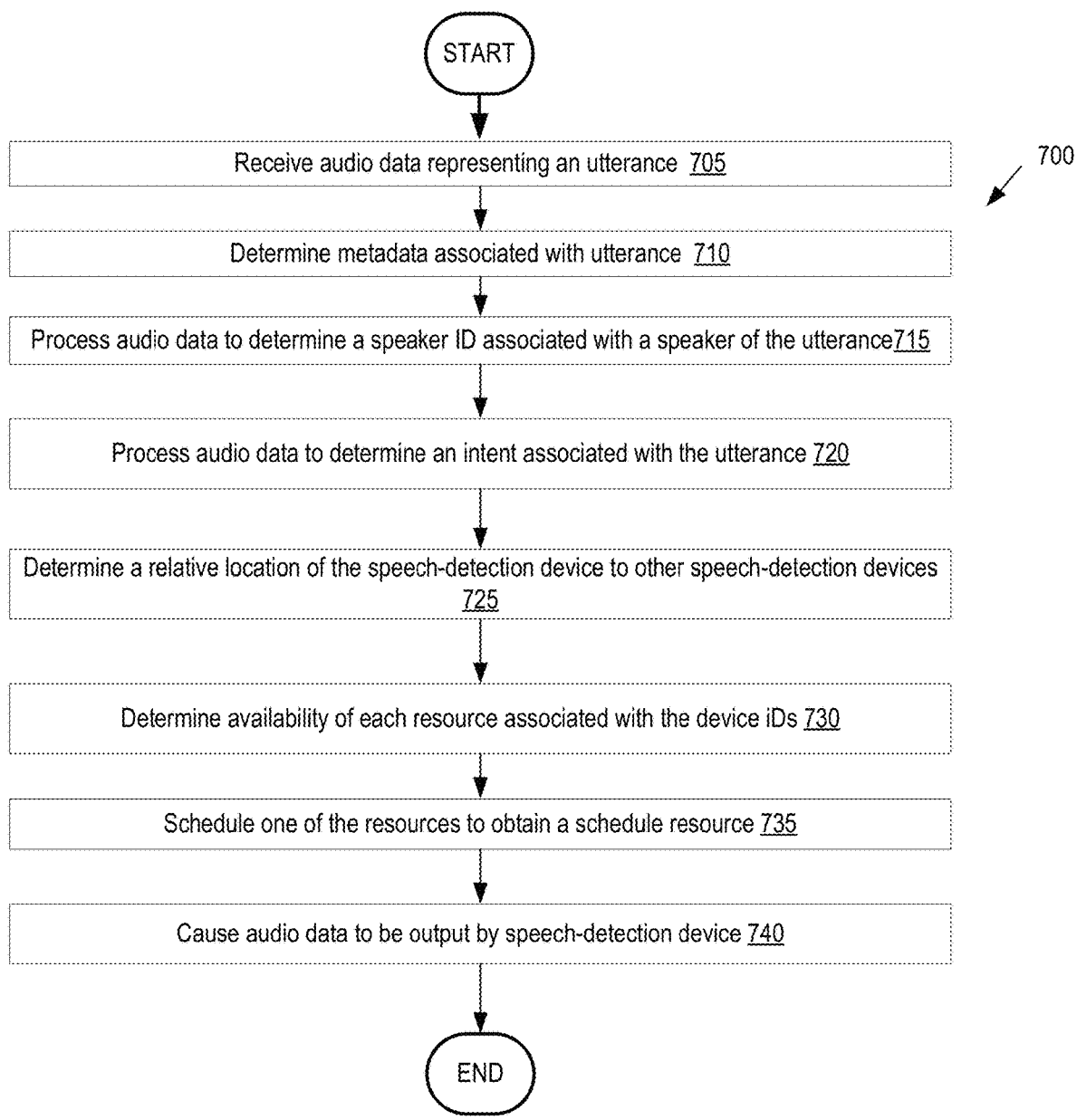
FIG. 7 is a flow diagram illustrating a method for scheduling a nearby meeting room according to embodiments of the present disclosure.
Figure 8:
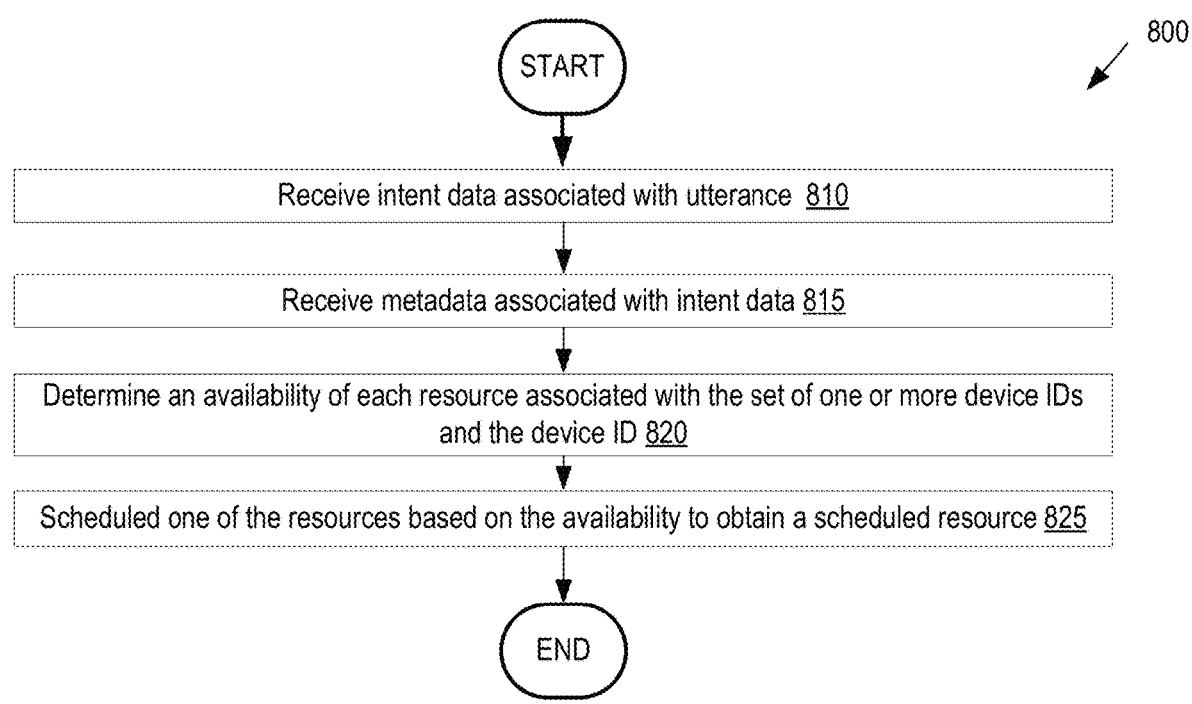
FIG. 8 is a flow diagram illustrating a method for performing resource scheduling using a machine learning model according to embodiments of the present disclosure.

FIGS. 6-8 are flow diagrams illustrating methods 600, 700, 800 associated with generating machine learning models for resource scheduling and applying such machine learning models to perform resource scheduling according to embodiments of the present disclosure. The methods 600, 700, 800 may be performed by a processing logic that may comprise hardware (e.g., circuitry, dedicated logic, programmable logic, microcode, etc.), software (e.g., instructions run on a processing device to perform hardware simulation), or a combination thereof. In some embodiments, at least some operations of methods 600, 700 and/or 800 are performed by a resource scheduling component 182 executed by one or more server(s) 120*a-n*.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram and/or events.

FIG. 6 is a flow diagram illustrating a method 600 for scheduling a nearby meeting room using a speech-detection device according to embodiments of the present disclosure. At block 602 of method 600, processing logic receives, from a first speech-detection device, audio data representing an utterance. At block 604, processing logic determines metadata associated with the utterance. The metadata may include at least one of a first ID of the speech-detection device 110 or a location of the speech-detection device 110 and a set of device IDs, each device ID of the set corresponding to another speech-detection device located in proximity to the location of the speech-detection device 110 and that communicates with the speech-detection device 110 using a short-range wireless mesh network standard. At block 606, processing logic processes the audio data to determine an intent associated with the utterance and a resource scheduling component to satisfy the intent. At block 608, processing logic determines an availability of each meeting room associated with each of the first device ID and the set of device IDs. At block 610, processing logic schedules an available meeting room based on the availability, the available meeting room being in proximity to the location of the speech-detection device 110. In one embodiment, processing logic schedules the available meeting room comprises updating a calendar associated with the available meeting room. At block 612, processing logic outputs to the speech-detection device 110 an audio confirmation of scheduling the available meeting room.

In a further embodiment, processing logic processes the audio data to determine a speaker ID associated with a speaker of the utterance and updates a calendar associated with speaker ID. In another embodiment, processing logic processes the audio data to determine an equipment constraint associated with the intent. In another embodiment, processing logic processes the audio data to determine a time constraint. Processing logic, to determine the availability of each meeting room, can check the availability of each meeting room associated with each of the first device ID and the set of device IDs in view of the equipment constraint, time constraint, or any combination thereof. Processing logic schedules the available meeting room that meets the equipment constraint.

FIG. 7 is a flow diagram illustrating a method 700 for scheduling a nearby meeting room according to embodiments of the present disclosure. At block 705 of method 700, processing logic receives audio data representing an utterance from a speech-detection device. At block 710, processing logic determines metadata associated with the utterance. At block 715, processing logic processes the audio data to determine a speaker ID associated with a speaker of the utterance. At block 720, processing logic processes the audio data to determine an intent associated with the utterance (e.g., entity data and/or intent data) and/or a component ID of a component to satisfy the intent. This may include determining intent data, entity data, and/or a component in embodiments. At block 725, processing logic processes the audio data to determine a relative location of the speech-detection device to other speech-detection devices. As described herein, the location or device ID of the speech-detection device 110 may be included in metadata, along with device IDs associated with nearby devices detected by the speech-detection device 110 using a short range wireless mesh network standard.

At block 730, processing logic determines an availability of each meeting room associated with the set of one or more device IDs and the device ID. At block 735, processing logic scheduled one of the meeting rooms associated with the set of one or more device IDs and the device ID based on the availability to obtain a scheduled meeting room. The scheduled meeting room is located in proximity to the location of the speech-detection device. At block 740, processing logic causes audio data to be output by the speech-detection device 110. Although methods 600 and 700 described scheduling meeting rooms, in other embodiments, similar methods may be used to schedule a resource associated with a device that is discovered by the speech-detection device 110 via the short-range wireless mesh network standard.

FIG. 8 is a flow diagram illustrating a method 800 for scheduling a resource a according to embodiments of the present disclosure. At block 810 of method 800 processing logic receives intent data comprising an intent to schedule a resource located in proximity to a location of a speech-detection device. At block 815, processing logic receives metadata comprising a location and a device identifier (ID) of the speech-detection device and a set of one or more device IDs associated with one or more devices discovered by the speech-detection device. Each of the set of one or more IDs and the device ID is associated with a resource that can be scheduled. At block 820, processing logic determines an availability of each resource associated with the set of one or more device IDs and the device ID. At block 825, processing logic schedules one of the resources associated with the set of one or more device IDs and the device ID based on the availability to obtain a scheduled resource. The scheduled resource is located in proximity to the location of the speech-detection device.

Figure 9:
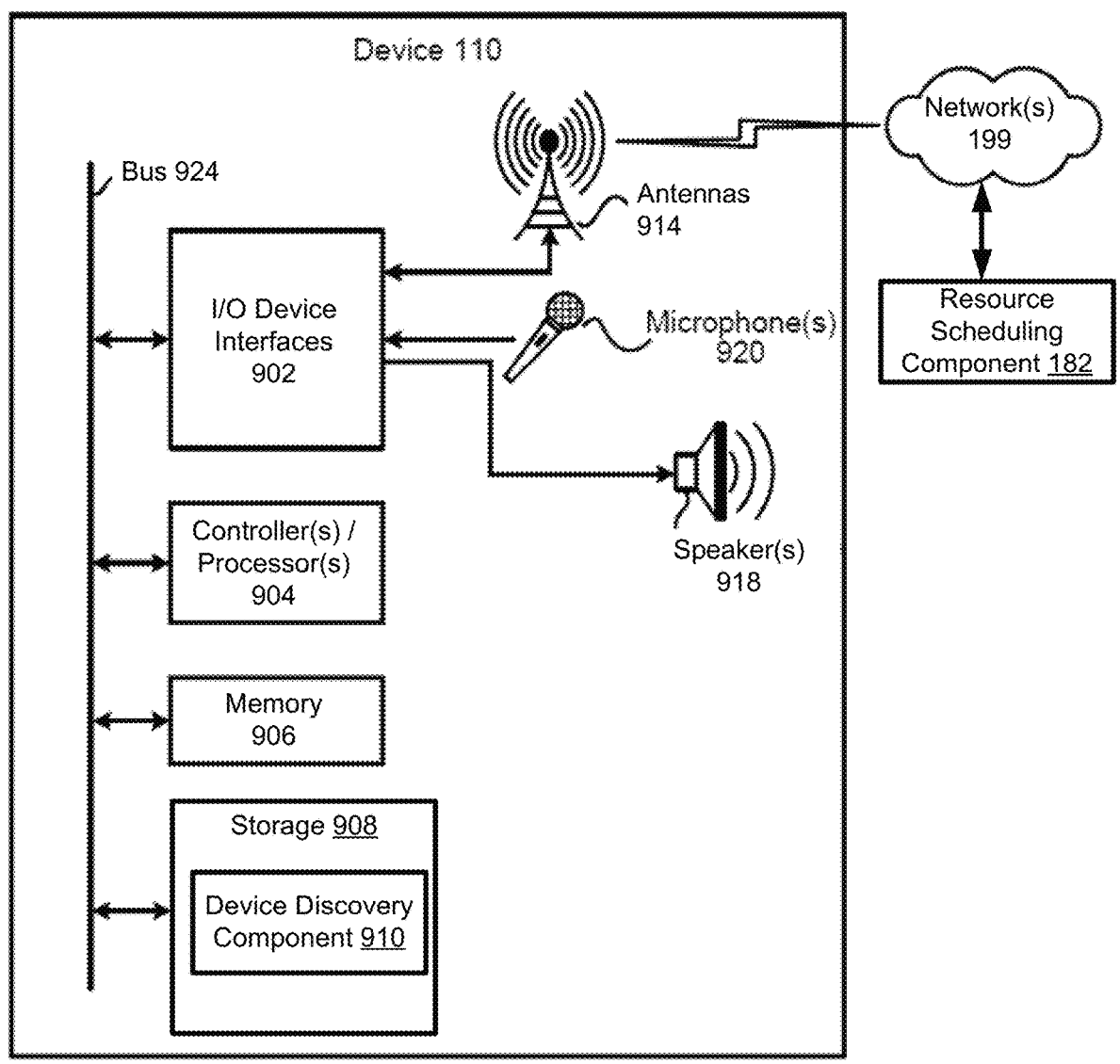
FIG. 9 is a block diagram conceptually illustrating example components of a device according to embodiments of the present disclosure.
Figure 10:
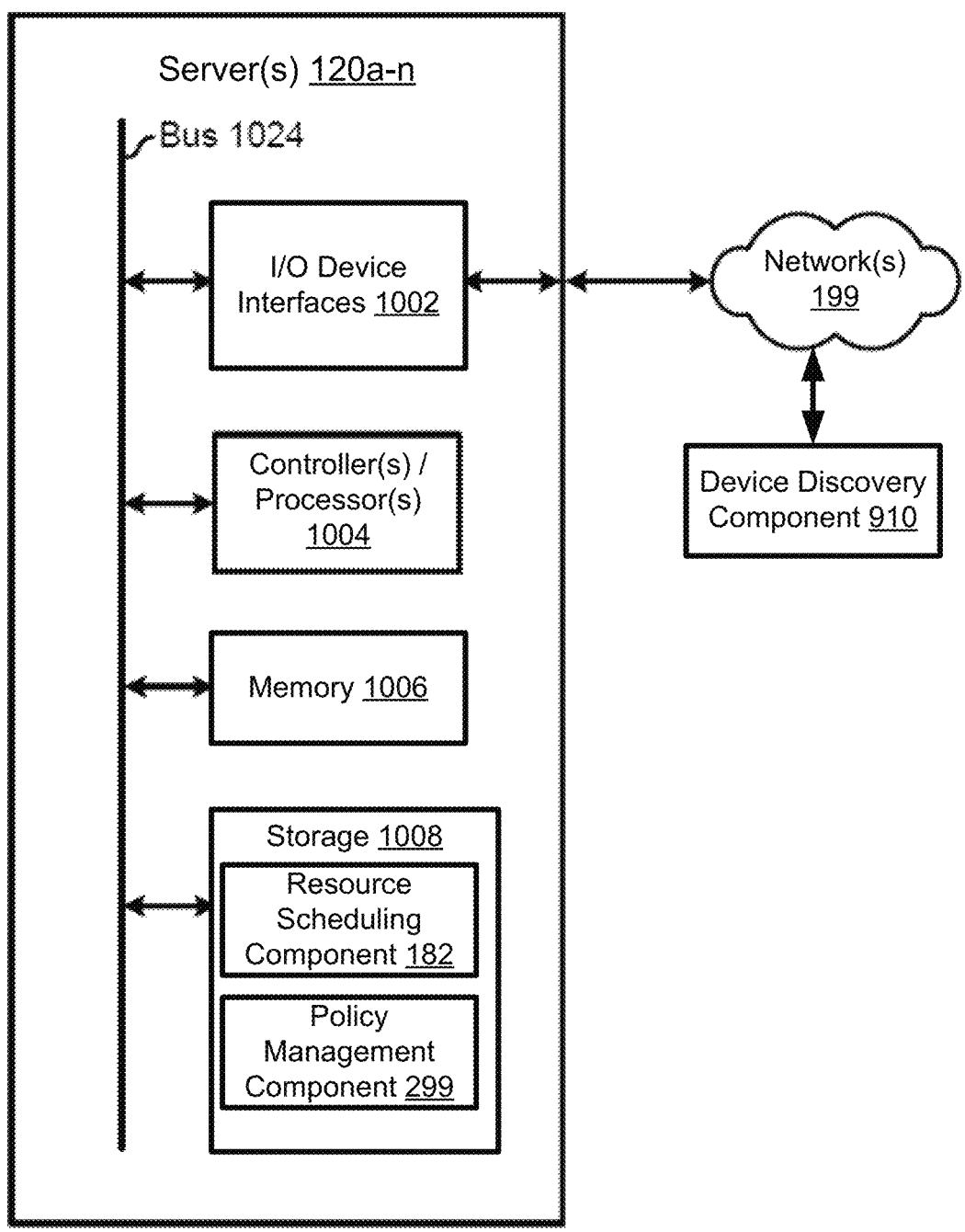
FIG. 10 is a block diagram conceptually illustrating example components of a server according to embodiments of the present disclosure.

FIG. 9 is a block diagram conceptually illustrating a speech-detection device 110 that may be used with the described system 100. FIG. 10 is a block diagram conceptually illustrating example components of a remote device, such as the server(s) 120a-n, which may assist with ASR processing, NLU processing, and/or command processing. Multiple servers 120a-n may be included in the system 100, such as one server for performing ASR, one server for performing NLU, etc. In operation, each of these devices (or groups of devices) may include computer-readable and computer-executable instructions that reside on the respective device 110, 120a-n, as will be discussed further below. The computer-executable instructions, when executed by at least one processor cause the at least one processor to perform the various operations described herein.

The speech-detection device 110 and servers 120a-n may include one or more controllers/processors 904, 1004, which may each include a central processing unit (CPU) for processing data and computer-readable instructions, and a memory 906, 1006 for storing data and instructions of the respective device. The memories 906, 1006 may individually include volatile random access memory (RAM), non-volatile read only memory (ROM), non-volatile magnetoresistive (MRAM), and/or other types of memory. The speech-detection device 110 and servers 120a-n may also include a data storage component 908, 1008 for storing data and controller/processor-executable instructions. Each data storage component 908, 1008 may individually include one or more non-volatile storage types such as magnetic storage, optical storage, solid-state storage, etc. Storage 908 may include device discovery component 910. In another embodiment, the storage 908 includes a device discovery component 910, which may include instructions to identify a list of nearby devices, as described herein. In another embodiment, some of the operations described herein with respect to the resource scheduling component 182 may be stored in the storage 908 and performed by the controller/processor 904. Storage 1008 may include resource scheduling component 182 and/or policy management component 299 in embodiments. The speech-detection device 110 and servers 120a-n may also be connected to removable and/or external non-volatile memory and/or storage (such as a removable memory card, memory key drive, networked storage, etc.) through respective input/output device interfaces 902, 1002.

Computer instructions for operating speech-detection device 110 and servers 120a-n and their various components may be executed by the respective device's controller(s)/processor(s) 904, 1004, using the memory 906, 1006 as temporary "working" storage at runtime. A device's computer instructions may be stored in a non-transitory manner in non-volatile memory 906, 1006, storage 908, 1008, and/or an external device(s). Alternatively, some or all of the executable instructions may be embedded in hardware and/or firmware on the respective device in addition to or instead of software.

The speech-detection device 110 and servers 120a-n each includes input/output device interfaces 902, 1002. A variety of components may be connected through the input/output device interfaces 902, 1002, as will be discussed further below. Additionally, speech-detection device 110 and servers 120a-n may include an address/data bus 924, 1024 for conveying data among components of the respective device. Each component within a speech-detection device 110 and servers 120a-n may also be directly connected to other components in addition to (or instead of) being connected to other components across the bus 924, 1024.

Referring to FIG. 9, the speech-detection device 110 may include input/output device interfaces 902 that connect to a variety of components such as an audio output component such as a speaker(s) 918, a wired headset and/or a wireless headset (not illustrated), and/or other component capable of outputting audio. The speech-detection device 110 may also include an audio capture component. The audio capture component may be, for example, a microphone 920 or array of microphones, a wired headset and/or a wireless headset (not illustrated), etc. The microphone(s) 920 may be configured to capture audio. If an array of microphones 920 is included, approximate distance to a sound's point of origin may be determined by acoustic localization based on time and amplitude differences between sounds captured by different microphones of the array.

Via antenna(s) 914, the input/output device interfaces 902 may connect to one or more networks 199 via a wireless local area network (WLAN such as Wi-Fi®) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment.

In one embodiment, the input/output device interfaces 902 includes a first radio coupled to a first antenna and a second radio coupled to a second antenna. The input/output device interfaces 902 may also include AFE circuitry coupled to the microphone 920 to capture audio data corresponding to a spoken utterance. The first radio and first antenna can be used to discover other nearby devices as described herein. The second radio and second antenna can be used to communicate with a web service over the networks 199, such as the Internet. In one embodiment, the first radio is a wireless PAN radio and the second radio is a wireless local area network (WLAN). The first radio can discover and/or communicate with the other devices, via the first antenna, using a short-range wireless mesh network protocol. The controllers/processors 904 may include a processor coupled to the AFE (not illustrated in FIG. 9), the first radio, and the second radio. The processor can convert the audio data to text data determine intent data from the text data. The intent data may include or specify an intent to schedule a resource located in proximity to a location of the speech-detection device. A resource is associated with each of the set of one or more speech-detection devices. The processor can identify a set of one or more speech-detection devices located in proximity to the location of the speech-detection device. For example, the speech-detection device 110 can communicate with the set of one or more speech-detection devices via the first radio. The processor can send a request to a web service via the second radio. The request may include the intent data and entity data. The entity data may specify the location of the speech-detection device and a set of identifiers corresponding to the set of one or more speech-detection devices located in proximity to the location. The web service, in response to the request, schedules a resource associated with the one of the set of one or more speech-detection devices using the entity data. The processor can receive a response from the web service via the second radio. The response may include a textual confirmation of a scheduled resource and convert the textual confirmation to an audio confirmation to be output via the speaker 918. Alternatively, the response may include an audio confirmation. In another embodiment, the response may simply include an indicator of completion which causes the processor to output an audio confirmation via the speaker 918.

In another embodiment, the processor can process the audio data to determine a speaker ID associated with a speaker of the utterance. The entity data may further specify the speaker ID in connection with the intent to schedule a resource. In another embodiment, the processor can send a request to update a calendar associated with the speaker ID in view of the scheduled resource, such as via a calendar API to a calendar service.

It should be noted that in other embodiments, the processor can capture the audio data via the microphone 920 to obtain captured audio data and send the captured audio data to the web service in connection with the a set of identifiers corresponding to the set of one or more speech-detection devices located in proximity to the location. The web service can determine intent data from the captured audio data, as well as process the metadata including the set of device IDs for purposes of scheduling the resource.

As noted above, multiple devices may be employed in a single speech processing system 100. In such a multi-device system, each of the devices may include different components for performing different aspects of the speech processing. The multiple devices may include overlapping components. The components of the speech-detection device(s) 110 and the server(s) 120a-n, as illustrated in FIGS. 9 and 10, are exemplary, and may be located as a stand-alone device and/or may be included, in whole or in part, as a component of a larger device and/or system.

Figure 11:
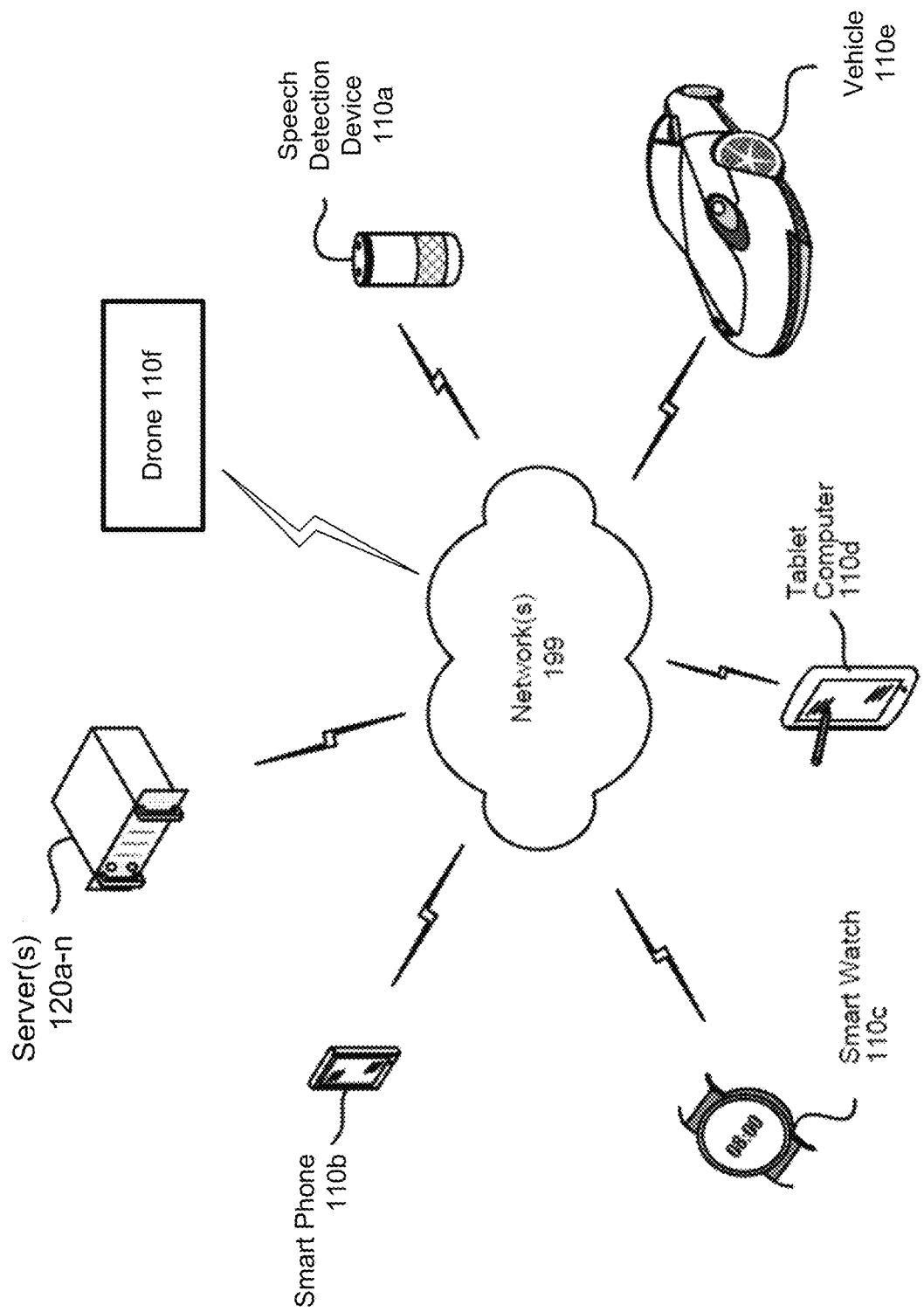
FIG. 11 illustrates an example of a computer network for use with the speech processing system.

As illustrated in FIG. 11, multiple devices (110-110e, 120a-n) may contain components of the system 100 and the devices may be connected over a network(s) 199. The network(s) 199 may include a local and/or private network and/or may include a wide network such as the Internet. Devices may be connected to the network(s) 199 through either wired and/or wireless connections. For example, a speech-detection device 110, a smart phone 110b, a smart watch 110c, a tablet computer 110d, a vehicle 110e, and/or a drone 110f may be connected to the network(s) 199 through a wireless component provider, over a Wi-Fi and/or cellular network connection, or the like. Other devices are included as network-connected support devices, such as the server(s) 120a-n, or others. The support devices may connect to the network(s) 199 through a wired connection and/or wireless connection. Networked devices may capture audio using one-or-more built-in and/or connected microphones and/or audio capture devices, with processing performed by ASR, NLU, and/or other components of the same device and/or another device connected via the network(s) 199, such as the ASR component 250, the NLU component 260, the resource scheduling component 182, etc. of one or more servers 120a-n.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The non-transitory computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a first speech-detection device, audio data representing an utterance;
   determining metadata associated with the utterance, the metadata comprising at least one of a first device identifier (ID) of the first speech-detection device or a location of the first speech-detection device and a set of device IDs, each device ID of the set corresponds to another speech-detection device located in proximity to the location of the first speech-detection device and that communicates with the first speech-detection device using a short-range wireless mesh network standard;
   processing the audio data to determine an intent associated with the utterance and a resource scheduling component to satisfy the intent;
   determining, by the resource scheduling component, an availability of each meeting room associated with each of the first device ID and the set of device IDs;
   scheduling, by the resource scheduling component, an available meeting room based on the availability, the available meeting room being in proximity to the location of the first speech-detection device; and
   outputting to the first speech-detection device an audio confirmation of scheduling the available meeting room.

2. The computer-implemented method of claim 1, wherein scheduling the available meeting room comprises updating a calendar associated with the available meeting room.

3. The computer-implemented method of claim 2, further comprising:
   processing the audio data to determine a speaker ID associated with a speaker of the utterance; and
   updating a calendar associated with speaker ID.

4. The computer-implemented method of claim 1, further comprising:
   processing the audio data to determine an equipment constraint associated with the intent, wherein the determining the availability of each meeting room comprises determining the availability of each meeting room associated with each of the first device ID and the set of device IDs in view of the equipment constraint, and wherein scheduling the available meeting room comprises scheduling the available meeting room that meets the equipment constraint.

5. A computer-implemented method comprising:
   receiving, by a resource scheduling component executed by at least one processing device, intent data from a speech-detection device, the intent data comprising an intent to schedule a resource located in proximity to a location of the speech-detection device;
   receiving, by the resource scheduling component from the speech-detection device, metadata comprising the location of the speech-detection device, a device identifier (ID) that identifies the speech-detection device, and a set of one or more device IDs identifying one or more devices discovered by the speech-detection device, wherein each of the set of one or more device IDs and the device ID is associated with a resource that can be scheduled;
   determining, by the resource scheduling component, an availability of each resource associated with the set of one or more device IDs and the device ID; and
   scheduling, by the resource scheduling component, one of the resources associated with the set of one or more device IDs and the device ID based on the availability to obtain a scheduled resource, wherein the scheduled resource is located in proximity to the location of the speech-detection device.

6. The computer-implemented method of claim 5, further comprising:
   receiving, from the speech-detection device, audio data representing an utterance corresponding to the intent data and the metadata;
   processing the audio data to determine the intent associated with the utterance; and
   determining the metadata associated with the utterance.

7. The computer-implemented method of claim 5, wherein the one or more devices communicate with the speech-detection device using a short-range wireless mesh network standard.

8. The computer-implemented method of claim 5, further comprising outputting to the speech-detection device an audio confirmation of the scheduled resource.

9. The computer-implemented method of claim 5, wherein determining the metadata comprises:
retrieving the location and the device ID from a profile associated with the speech-detection device; and
retrieving from a radio configuration table the set of one or more device IDs associated with the one or more devices discovered by the speech-detection device, wherein the radio configuration table is stored in response to a discovery process performed by the speech-detection device.

10. The computer-implemented method of claim 5, wherein the determining the availability of each resource comprises accessing a calendar associated with the respective device ID.

11. The computer-implemented method of claim 10, further comprising:
receiving, from the speech-detection device, audio data representing an utterance corresponding to the intent data and the metadata; and
processing the audio data to determine a time constraint associated with the intent for scheduling the resource, wherein the determining the availability of each resource comprises accessing a calendar associated with the respective device ID and determining availability in the calendar in view of the time constraint, and wherein the scheduled resource meets the time constraint.

12. The computer-implemented method of claim 5, further comprising:
receiving, from the speech-detection device, audio data representing an utterance corresponding to the intent data and the metadata;
processing the audio data to determine an equipment constraint associated with the intent for scheduling the resource, wherein the determining the availability of each resource comprises:
filtering the set of device IDs and the device ID based on the equipment constraint to obtain a subset of IDs; and
accessing a calendar associated with each of the subset of IDs to determine an availability of the respective resource, and wherein the scheduled resource meets the equipment constraint.

13. The computer-implemented method of claim 5, further comprising:
receiving authentication credentials associated with the device ID; and
authenticating the device ID in view of the authentication credentials.

14. The computer-implemented method of claim 5, wherein scheduling the scheduled resource comprises updating a calendar associated with the scheduled resource.

15. The computer-implemented method of claim 14, further comprising:
receiving, from the speech-detection device, audio data representing an utterance corresponding to the intent data and the metadata;
processing the audio data to determine a speaker ID associated with a speaker of the utterance; and
updating a calendar associated with the speaker ID.

16. A speech-detection device comprising:
a microphone;
acoustic front end (AFE) circuitry coupled to the microphone to capture audio data corresponding to a spoken utterance;
a first radio coupled to a first antenna;
a second radio coupled to a second antenna;
a processor coupled to the AFE, the first radio, and the second radio, wherein the processor is to:
convert the audio data to text data;
determine intent data from the text data, the intent data comprising an intent to schedule a resource located in proximity to a location of the speech-detection device;
identify a set of one or more speech-detection devices located in proximity to the location of the speech-detection device, wherein the set of one or more speech-detection devices communicate with the speech-detection device via the first radio, wherein a resource is associated with each of the set of one or more speech-detection devices;
send a request to a web service via the second radio, the request comprising the intent data and entity data, wherein the entity data specifies the location of the speech-detection device and a set of identifiers corresponding to the set of one or more speech-detection devices located in proximity to the location, wherein the web service, in response to the request, schedules a resource associated with the one of the set of one or more speech-detection devices using the entity data; and
receive a response from the web service via the second radio, the response comprising a textual confirmation of a scheduled resource, wherein the scheduled resource is located in proximity to the location of the speech-detection device.

17. The speech-detection device of claim 16, further comprising a speaker coupled to the processor, wherein the processor is further to:
convert the text confirmation to an audio response; and
output the audio response to the speaker.

18. The speech-detection device of claim 16, wherein the processor is further to process the audio data to determine a speaker ID associated with a speaker of the spoken utterance, wherein the entity data further specifies the speaker ID.

19. The speech-detection device of claim 18, wherein the processor is further to send a request to update a calendar associated with the speaker ID in view of the scheduled resource.

20. The speech-detection device of claim 16, wherein the first radio is a wireless personal area network (PAN) radio, and wherein the second radio is a wireless local area network (WLAN) radio.

* * * * *